April 25, 1950   E. J. SCHWEITZER ET AL   2,505,652
TAIL WHEEL ACTUATED ARRESTING HOOK
Filed Feb. 8, 1946   3 Sheets-Sheet 3
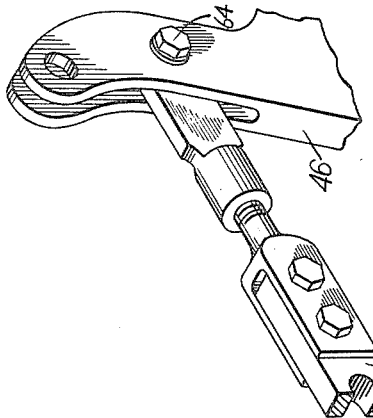
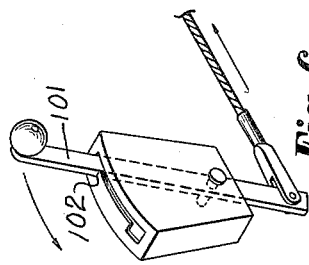
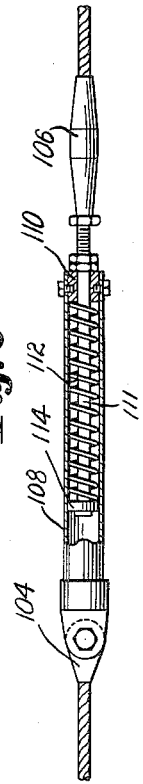
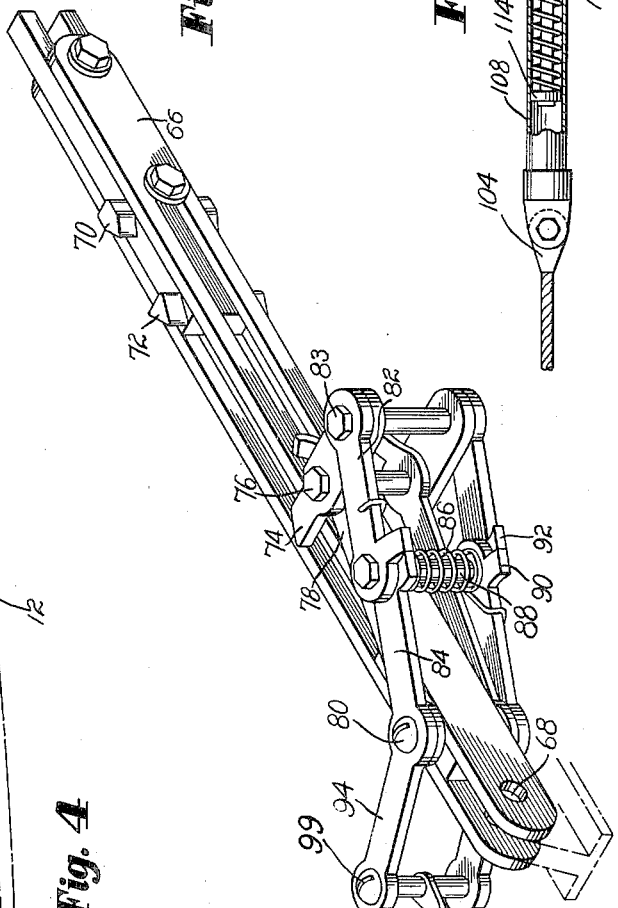
INVENTORS
Edwin J. Schweitzer
Carmine Jordan
BY  M. B. Tasker
ATTORNEY Patented Apr. 25, 1950

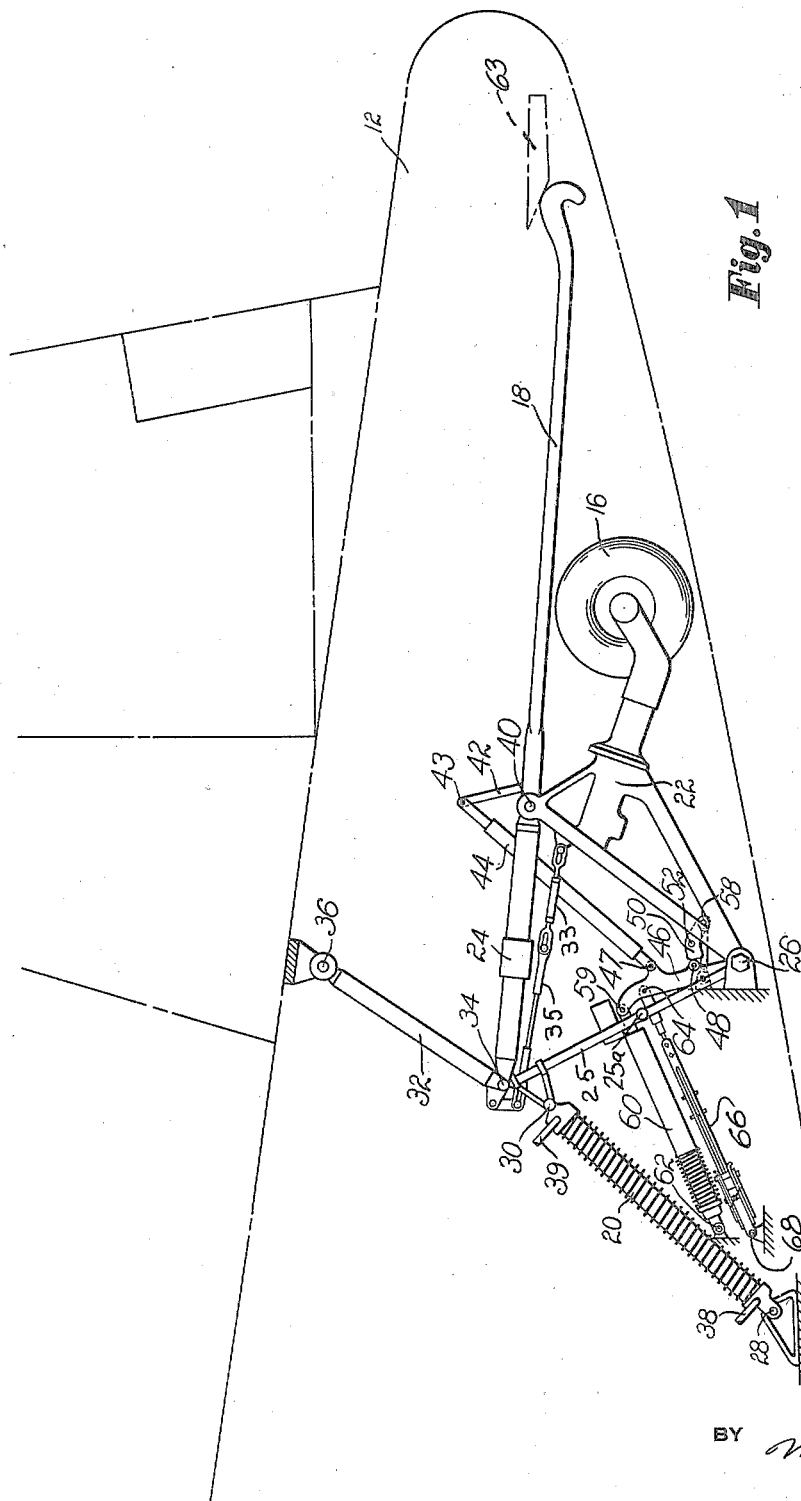

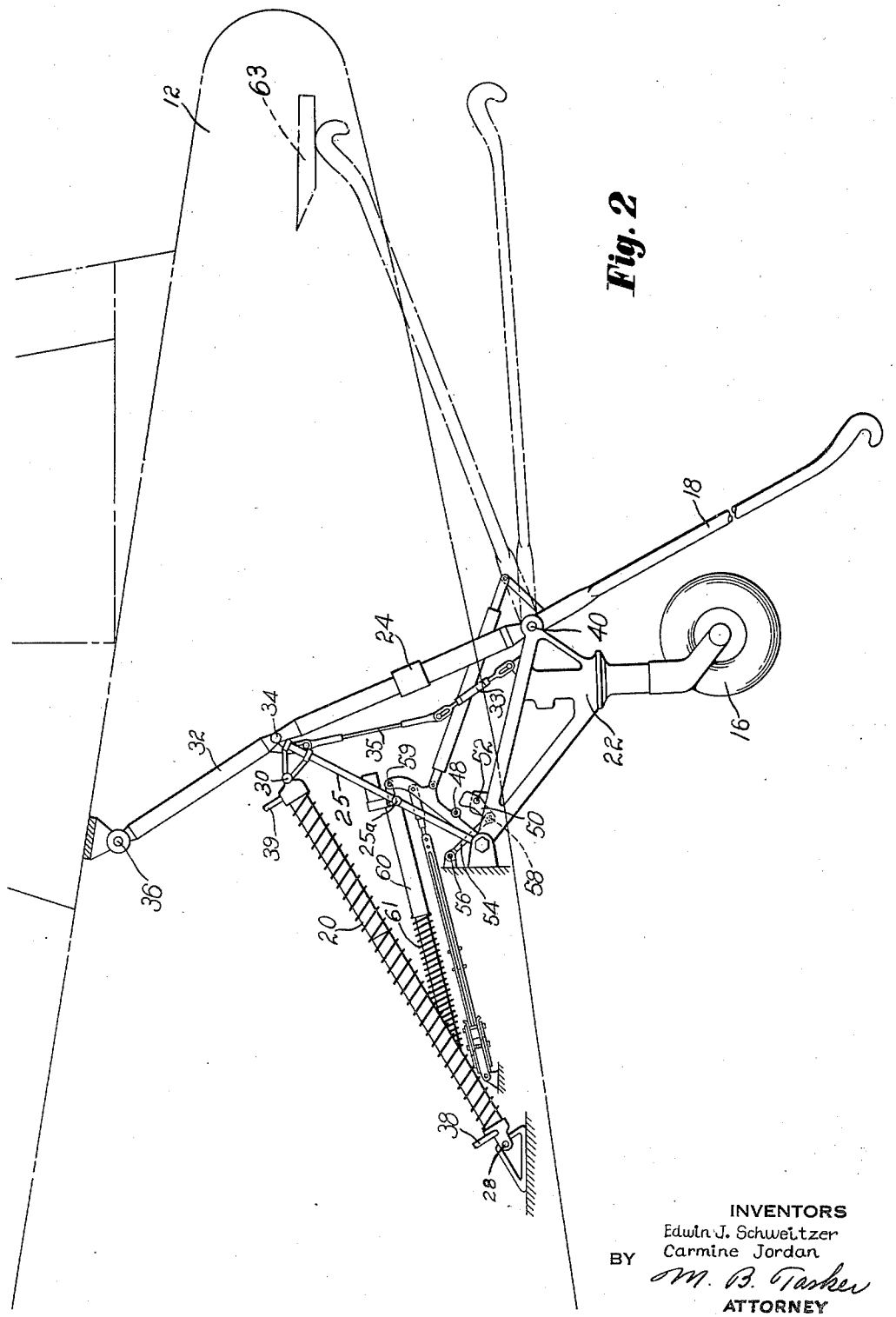

2,505,652

UNITED STATES PATENT OFFICE 2,505,652

TAIL WHEEL ACTUATED ARRESTING HOOK

Edwin J. Schweitzer, Milford, and Carmine Jordan, New Haven, Conn., assignors to United Aircraft Corporation, East Hartford, Conn., a corporation of Delaware Application February 8, 1946, Serial No. 646,306

10 Claims. (Cl. 244—110)

This invention relates to aircraft and particularly to airplanes provided with retractable arresting hooks used in landing on the flight decks of aircraft carriers or other restricted areas.

Heretofore a pilot in making a landing on a carrier deck was obliged to extend his landing gear and his arresting hook as two operations, separate hydraulically operated mechanisms being provided for controlling these two units.

It is an object of this invention to provide means for operating the arresting gear utilizing energy derived from retraction of the tail wheel.

Another object of the invention is to provide a combined retractable tail wheel and arresting gear having a common hydraulic operating mechanism.

A further object of the invention is to provide a mechanism of the above type having provision for latching the arresting gear in retracted position, if the pilot desires, during extension and retraction of the tail wheel.

A further object is to provide means for latching an arresting hook in a partially retracted position during take-off.

A still further object of the invention is to provide a tail wheel unit operated arresting hook.

A further object is generally to improve the construction and operation of retractable gear for airplanes.

Other objects and advantages of the invention will be obvious from the following detailed description of one embodiment of the invention shown in the accompanying drawings for purposes of illustration.

In these drawings,

Fig. 1 is a side elevation of a combined airplane tail wheel and arresting hook mechanism embodying the invention, the aft portion of the airplane being shown in phantom and the mechanism being shown in its retracted position;

Fig. 2 is a view similar to Fig. 1 with the mechanism shown in its extended position, the arresting hook also being indicated in dotted lines in the positions it occupies when the tail wheel is extended and the arresting hook is latched in its retracted and parked positions respectively;

Fig. 3 is a perspective view on a much enlarged scale of the latching mechanism for the arresting hook;

Fig. 4 is a phantom view of the airplane showing the pilot operated cable release for the latching mechanism of Fig. 3;

Fig. 5 is a detail, partly in section, of a lost motion connection in the latch control cable; and Fig. 6 is a detail perspective view of the operating lever for the latch control cable.

As herein shown, the invention is embodied in an airplane 10 having a fuselage 12 including a pilot compartment 14. The airplane also has a tail wheel 16 (Fig. 2) and an arresting hook 18 both of which are retractable into a concealed position in the fuselage (Fig. 1) by hydraulic actuating means including the hydraulic strut 20.

The retractable tail wheel assembly is generally triangular and includes a tail wheel housing 22 in which the tail wheel is mounted for swivelling movement, a tail wheel oleo-pneumatic strut 24 and a guide link 25. This triangular assembly is pivoted at 26 and is adapted to be swung bodily about its pivot by the hydraulic actuating strut 20 which has one of its ends pivoted at 28 to fixed airplane structure and its movable end pivoted at 30 to the triangular tail wheel assembly. The assembly is guided in its movements by a link 32 pivoted to the assembly at 34 and pivoted to fixed framework of the fuselage at 36.

Link 25 is hinged at 25a intermediate its ends thereby providing for clockwise movement of the hinge 25a about pivot 26, but preventing any counterclockwise movements of the hinge past the slightly over-center position of link 25. The extension of strut 20 produced a counterclockwise movement of the hinge 25a about pivot 34 which causes link 25 to break, thereby allowing the triangular tail wheel assembly to move into the Fig. 2 position. When the link 25 is in the Fig. 1 position, it locks the members 32 and 24, thus contributing to the support of the tail wheel assembly in the retracted position. The particular construction of the link 32, link 25, the triangular tail wheel assembly and the hinge movement caused by strut 20 do not form a part of this invention and are well known in the art, for example, in Albright's Patent No. 2,421,729.

Hydraulic fluid under pressure is supplied to the end fittings of strut 20 through connections 38 and 39 to extend and collapse the strut 20 and move the tail wheel assembly between its extended position shown in Fig. 2 and its retracted position shown in Fig. 1. As the triangular tail assembly is moved into the retracted position of Fig. 1, a pair of links 33, 35 having slotted connections with the tail wheel housing and link 32 act in tension to somewhat compress the oleo strut, while in the Fig. 2 position these links permit full collapse of the strut, all in a well-known manner.

The arresting hook 18 is pivoted at 40 to the triangular frame of the tail wheel assembly and carries a rigid arm 42 which with the hook 18 forms a bellcrank of which the arm 42 is the actuating arm. The free extremity of arm 42 is pivoted at 43 to a link 44 the other end of which is pivoted to a hook operating arm 46 pivoted at one of its ends at 26. The link 44 is pivoted to arm 46 at a point 47 intermediate the ends of the latter arm. Arm 46 also carries a roller 48 facing aft at a point approximately midway between its fixed pivot point 26 and its free end which is engaged by an actuating cam 50 pivotally mounted at 52 on the triangular frame of the tail wheel assembly adjacent pivot 26. Besides the actuating portion of the cam which engages roller 48 the cam has a tail portion on the other side of its pivot 52 which is connected to a fixed part of the airplane structure by a rigid link 54, the link 54 being pivoted at 56 to the airplane and at 58 to the tail portion of the cam.

The extended end of operating arm 46 is pivotally connected at 59 to the free end of a fore and aft extended dashpot 60 the forward end of which is pivoted at 62 to the airplane structure. Dashpot 60 includes a spring 61 which is compressed as the lever 46 is swung counterclockwise as viewed in Fig. 2 into the Fig. 1 position. The function of the dashpot 60 is to cushion the movement of the arresting hook in its movement toward retracted position prior to its engagement with hook engaging bumper 63 provided within the fuselage, and by the action of spring 61 to actuate the arresting hook to its extended position upon extending movement of the tail wheel.

Means is also provided for latching the arresting hook in a retracted position from which it can be released manually by the pilot if a carrier deck landing is contemplated. To this end the hook operating arm 46 has telescoping latching mechanism (Fig. 3) pivotally connected thereto. This mechanism comprises a slide 63 pivoted to lever 46 at 64 and slidable between two slotted guides of a cooperating latch carrying frame 66 pivoted at 68 to the airplane frame. The slide 63 has two longitudinally spaced pairs of ears 70 and 72 which protrude on opposite sides of the slide 63 either one of which is adapted to be engaged and held by latches 74 one of which is disposed on each side of frame 66.

Latch controlling structure is provided which is duplicated on opposite sides of the frame, as shown in Fig. 3. Each latch 74 is pivotally connected intermediate its ends at 76 to a link 78, the other end of which is pivoted at 80 to the frame 66. Also at the extremity remote from its latch face each latch 74 is pivoted to a link 82 at 83. Each link 82 comprises one link of a toggle the other link 84 of which is pivoted at 80. The two toggles comprising links 82, 84 have a torsional spring 86 about their common pivot 88 which constantly biases said toggles to collapse and trip latches 74. Manually operable means is provided, however, which can prevent collapse of the toggles and thus maintain the latches 74 against release of slide 63. To this end, toggle links 84 constitute one arm of an operating bellcrank the other arms 94 of which are connected by a pin 99 having one end of a cable 96 pivotally attached to it.

The cable 96 extends over suitable pulleys 98, 99 and 100 to a pivoted manually operable lever 101 in the pilot's cockpit 14. In the retracted position of hook 18, in which the slide 63 is releasably held against the force of spring 61 due to the engagement of ears 70 by latches 74, the lever 101 is disposed in a notch 102. In this position of the lever the bellcranks 84, 94 are held by cable 96 in a position in which the toggle comprising links 82, 84 occupies a position slightly short of center position in which it is arrested by the engagement of abutments 90, 92. By moving the lever 101 in the direction of the arrows in Fig. 6 the pilot can slacken cable 96, causing spring 86 to trip the latches 74 and release the arresting hook for operation upon the extending movement of the tail wheel. The arresting hook may be latches in a fully retracted position in which ears 70 are engaged by the latches 74 or in the intermediate dotted line position shown in Fig. 2 in which ears 72 are engaged by the latches.

The lost motion resilient connection shown in Fig. 5 is inserted in the cable 96 to enable the arresting hook to be moved into latched position by the tail wheel unit when the operating lever 101 is in the notch 102. This connection includes two cable attaching end fittings 104 and 106, of which the latter is longitudinally adjustable. Fitting 104 carries an elongated cylindrical housing 108 provided with an end closure 110 through which a longitudinally slidable end portion 111 of fitting 106 extends. A compression spring 112 is disposed on portion 111 within housing 108 between end closure 110 and an enlarged end 114 on portion 111. End fitting 106 is adjusted to compress spring 112 only sufficiently to enable the toggles 82, 84 to be moved against the bias of spring 86 to their almost on-center position in which abutments 90, 92 engage upon movement of lever 101 into notch 102.

In the operation of the mechanism it will be evident that with the parts in their retracted positions, as shown in Fig. 1, admission of fluid to the hydraulic actuating strut 20 to extend the same into the Fig. 2 position thereof will cause the triangular tail wheel assembly to rotate in a clockwise direction about the pivot 26 to extend the wheel 16, the oleo strut 24 during this movement extending slightly into its fully extended position. As the tail wheel assembly moves clockwise the cam portion of cam 50 is withdrawn from its Fig. 1 position, permitting the arresting hook 18, subject to the control which may be imposed upon it by latches 74, to move into its extended position. If the pilot wishes to make a carrier deck landing he disengages lever 101 from notch 102 and allows it to move forward under the bias of spring 86, thus releasing the tension on cable 96 as the bellcrank comprising arms 94 and 84 moves in a counterclockwise direction under the bias of spring 86 to break the toggle links 84, 82 and trip latches 74. The lever 101 is then returned to notch 102 to reset the latches 74. After the plane has landed, the deck crew manually raise the hook 18 into the intermediate "parked" position thereof in which ears 72 are engaged by latches 74. The plane can then be moved about the ship and can take off without interference from the hook. Immediately following take-off the pilot retracts his landing gear including the tail wheel.

When fully retracted the free end of hook 18 engages the bumper 63 with a force of approximately 50 pounds. The resistance of the bumper plus the resistance of spring 61 makes manual latching of the hook in its retracted position physically impossible. However, admission of hydraulic fluid to actuating strut 20 to retract the tail wheel assembly causes the cam 50 to engage roller 48 and move the operating lever 46 positively in a counterclockwise direction with ample force to actuate the arresting hook positively into its fully retracted position shown in Fig. 1. Following complete retraction of the landing gear the pilot disengages the lever 101 from the notch 102, the hook 18 being then held in retracted position by actuating strut 20. Although not shown herein, it will be evident that the lever 101 can readily be automatically cammed out of notch 102 by means responsive to the completion of the retracting operation of the landing gear, if desired. In this case the pilot would have to hold the lever 101 in its aft position during initial extension of the landing gear if he desired to latch the hook in retracted position when making a ground, or non-carrier, landing. As shown herein the hook is automatically latched in retracted position unless the pilot, following take-off, has released the tension on cable 96 by moving lever 101 forward.

It will be evident that as a result of this invention it has been made possible to operate an airplane arresting hook from the extending and retracting movements of the tail wheel and by the same hydraulic actuating strut, thus eliminating the hydraulic hook actuating strut, its control valve and associated hydraulic lines and thereby simplifying the mechanism and substantially reducing the weight.

It will further be evident that the duties of the pilot have been reduced and the danger of making a carrier deck landing with the arresting hook retracted has been minimized.

While a single embodiment of the invention has been described herein and shown in the drawings, it will be understood that numerous changes may be made in the construction and arrangement of the mechanism described without departing from the scope of the invention as defined in the appended claims.

What it is desired to secure by Letters Patent is:

1. In an airplane having a body, landing gear movable between retracted and extended positions relative to said body, an arresting hook movable between retracted and extended positions relative to said body, means for actuating said landing gear between its retracted and extended positions, and means controlled by the movement of said landing gear between its retracted and extended positions for correspondingly moving said arresting hook between its retracted and extended positions.

2. A combination as defined in claim 1 in which the means for moving the arresting hook between retracted and extended positions includes cam and follower elements associated with the landing gear and hook respectively.

3. In an airplane, a retractable tail wheel, a retractable arresting hook movable into a retracted position in said airplane, an actuating hydraulic strut for moving said tail wheel between its retracted and extended positions, means controlled by the movement of said landing gear from either one to the other of its positions for normally correspondingly moving said hook, and means, including a mechanically releasable telescoping link responsive to movements of said tail hook, for latching said hook in retracted position in said airplane during movement of said landing gear to its extended position.

4. In an airplane, a retractable tail wheel, a retractable arresting hook, an actuating hydraulic strut for moving said tail wheel between its retracted and extended positions, means controlled by the movement of said landing gear from either one to the other of its positions for normally correspondingly moving said hook, means, including a mechanically releasable telescoping link responsive to movements of said tail hook, for latching said hook in retracted position during movement of said landing gear to its extended position, and pilot operated means controlling the tripping of said latching means.

5. In an airplane, a retractable tail wheel, a retractable arresting hook, an actuating hydraulic strut for moving said tail wheel between its retracted and extended positions, means controlled by the movement of said landing gear from either one to the other of its positions for normally correspondingly moving said hook, means for latching said hook in retracted position during movement of said landing gear to its extended position, and means operated by the pilot for controlling the tripping of said latching means, said last mentioned means including a lost motion connection between said latching means and said pilot operated means.

6. In an airplane having a body, a tail wheel movable between an extended position and a position in which it is retracted into said airplane body, an arresting hook movable between an extended position and a position in which it is retracted into said airplane body, means operatively connecting said tail wheel and hook for joint operation into corresponding extended and retracted positions, and a common actuating mechanism for moving both said wheel and hook from their extended positions into their retracted positions within said airplane body.

7. In an airplane, a retractable tail wheel, a retractable arresting hook, means responsive to retracting movement of said wheel for retracting said hook including a cam operatively connected to said tail wheel and a cooperating follower operatively connected to said hook, a hydraulic actuating strut for moving said wheel between its extended and retracted positions, and means stressed by said follower during its movement by said cam for biasing said follower and hook into the extended position of the latter.

8. In an airplane, a retractable tail wheel, a retractable arresting hook, means responsive to retracting movement of said wheel for retracting said hook including a cam associated with said tail wheel and a cooperating follower associated with said hook, an actuating member for moving said tail wheel in a retracting direction, resilient means stressed by said actuating member during said retracting movement for biasing said hook for movement in the extending direction, and means for releasably holding said hook against the bias of said resilient means.

9. In an airplane, a retractable tail wheel and a retractable arresting hook, means responsive to retracting movement of said wheel for retracting said hook including a cam associated with said tail wheel, a cooperating follower associated with said hook, an actuating member for moving said tail wheel in a retracting direction, resilient means stressed by said actuating member during said retracting movement for biasing said hook for movement in the extending direction, means for releasably holding said hook against the bias of said resilient means, and manually operable means for releasing said holding means.

10. In an airplane, a retractable tail wheel, a retractable arresting hook, an actuating member for moving said tail wheel between its extended and retracted positions, a cam operatively associated with said tail wheel, a follower comprising a pivoted member operatively associated with said hook, and shock absorbing means including a spring stressed by said pivoted member during movement of said tail wheel and hook in one direction for biasing said member for movement in the opposite direction, means for latching said pivoted member against the bias of said spring, and manual means for releasing said latching means.

EDWIN J. SCHWEITZER.
CARMINE JORDAN.

REFERENCES CITED

The following references are of record in the file of this patent:

UNITED STATES PATENTS

| Number | Name | Date |
|---|---|---|
| 2,408,354 | Trimbach | Sept. 24, 1946 |
| 2,421,739 | Albright | June 10, 1947 |

FOREIGN PATENTS

| Number | Country | Date |
|---|---|---|
| 578,364 | Germany | June 12, 1933 |